(12) United States Patent
Hsieh et al.

(10) Patent No.: US 8,587,524 B2
(45) Date of Patent: Nov. 19, 2013

(54) REMOTE CONTROL FOR ELECTRONIC READER AND REMOTE CONTROL METHOD

(75) Inventors: Kuan-Hong Hsieh, Tu-Cheng (TW); Han-Che Wang, Tu-Cheng (TV); Bo-Ching Lin, Tu-Cheng (TW); Xin Zhao, Shenzhen (CN); Hua-Dong Cheng, Shenzhen (CN); Lu Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 250 days.

(21) Appl. No.: 13/077,988

(22) Filed: Apr. 1, 2011

(65) Prior Publication Data

US 2012/0044135 A1 Feb. 23, 2012

(30) Foreign Application Priority Data

Aug. 20, 2010 (CN) .......................... 2010 1 0258700

(51) Int. Cl.
*G09G 5/00* (2006.01)
(52) U.S. Cl.
USPC ...................... 345/169; 715/740; 348/E5.103

(58) Field of Classification Search
USPC .............. 345/156, 169; 715/740; 348/E5.103
See application file for complete search history.

(56) References Cited

U.S. PATENT DOCUMENTS

| RE39,059 E * | 4/2006 | Foster ........................... 715/744 |
| 7,382,760 B2 * | 6/2008 | Slamka et al. ................ 370/338 |
| 7,386,804 B2 * | 6/2008 | Ho et al. ....................... 715/776 |
| 8,049,593 B2 * | 11/2011 | Kim et al. .................... 340/4.31 |

FOREIGN PATENT DOCUMENTS

| CN | 101520816 A | 9/2009 |
| CN | 101771909 A | 7/2010 |

* cited by examiner

*Primary Examiner* — Abbas Abdulselam
(74) *Attorney, Agent, or Firm* — Altis & Wispro Law Group, Inc.

(57) ABSTRACT

A remote control comprises a button generating control signals; a transmission unit configured to transmit the control signals to an electronic reader; a microprocessor unit configured to analyze an operation type according to the control signals and generate operation signals corresponding to the operation type to signal the electronic reader to flip page. A remote control method applied in a remote control of an electronic reader is also provided.

3 Claims, 5 Drawing Sheets

REMOTE CONTROL FOR ELECTRONIC READER AND REMOTE CONTROL METHOD

BACKGROUND

1. Technical Field

The present disclosure relates to remote controls and, particularly, to a remote control for an electronic reader and a remote control method.

2. Description of the Related Art

Many electronic readers provide mechanical buttons for readers to input commands. However, repetitive operations may cause users to feel tired, and in addition, the mechanical buttons occupy space making miniaturization difficult.

BRIEF DESCRIPTION OF THE DRAWINGS

The components of the drawings are not necessarily drawn to scale, the emphasis instead being placed upon clearly illustrating the principles of a remote control of electronic reader and a remote control method. Moreover, in the drawings, like reference numerals designate corresponding parts throughout multiple views.

DETAILED DESCRIPTION

Figure 1:
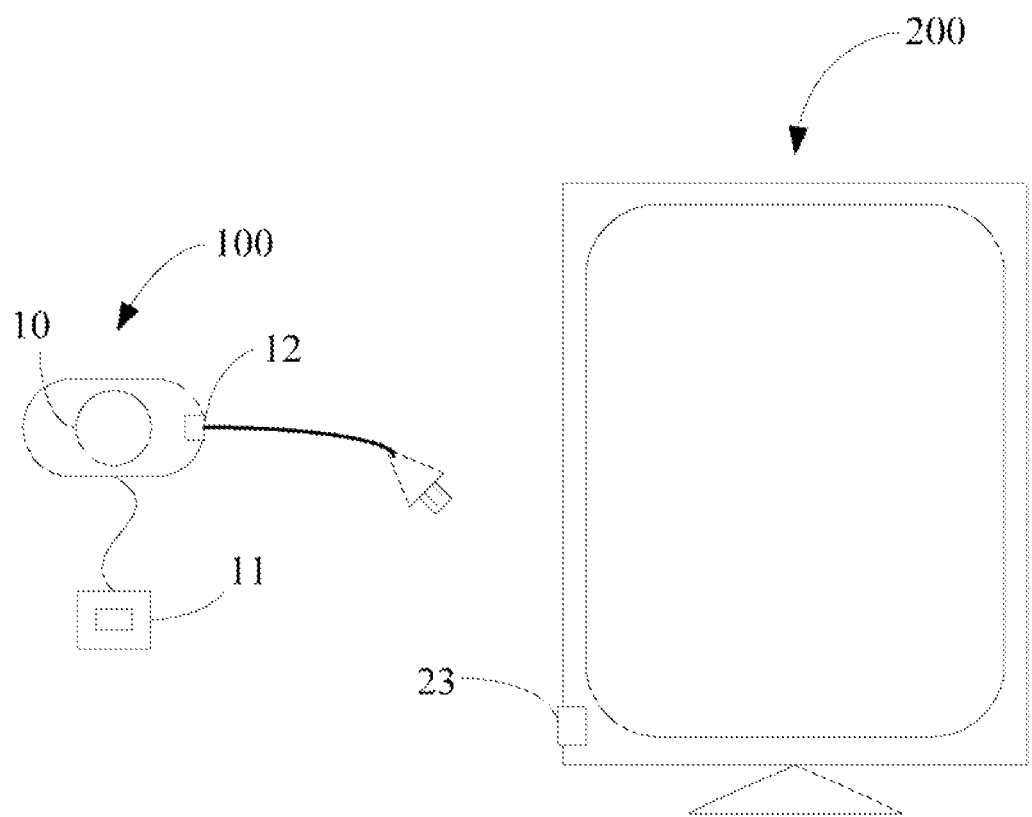
FIG. 1 is a schematic view of a remote control of an electronic reader in accordance with a first exemplary embodiment.

Referring to FIG. 1, a remote control 100 is configured to control an electronic reader 200 to flip pages. The remote control 100 includes an input unit 10, a microprocessor 11, and a transmission unit 12. The input unit 10 is a button and is configured for generating control signals. The microprocessor 11 analyses operation type of users according to the control signals and generates operation signals corresponding to the operation type. The transmission unit 12 transmits the operation signals to electronic reader 200. The operation type is a first type, a second type, or a third type. If the operation type is the first type, the electronic reader 200 flips a page forward; if the operation type is the second type, the electronic reader 200 flips a page backward; if the operation type is the third type, the electronic reader 200 returns to the homepage.

Figure 2:
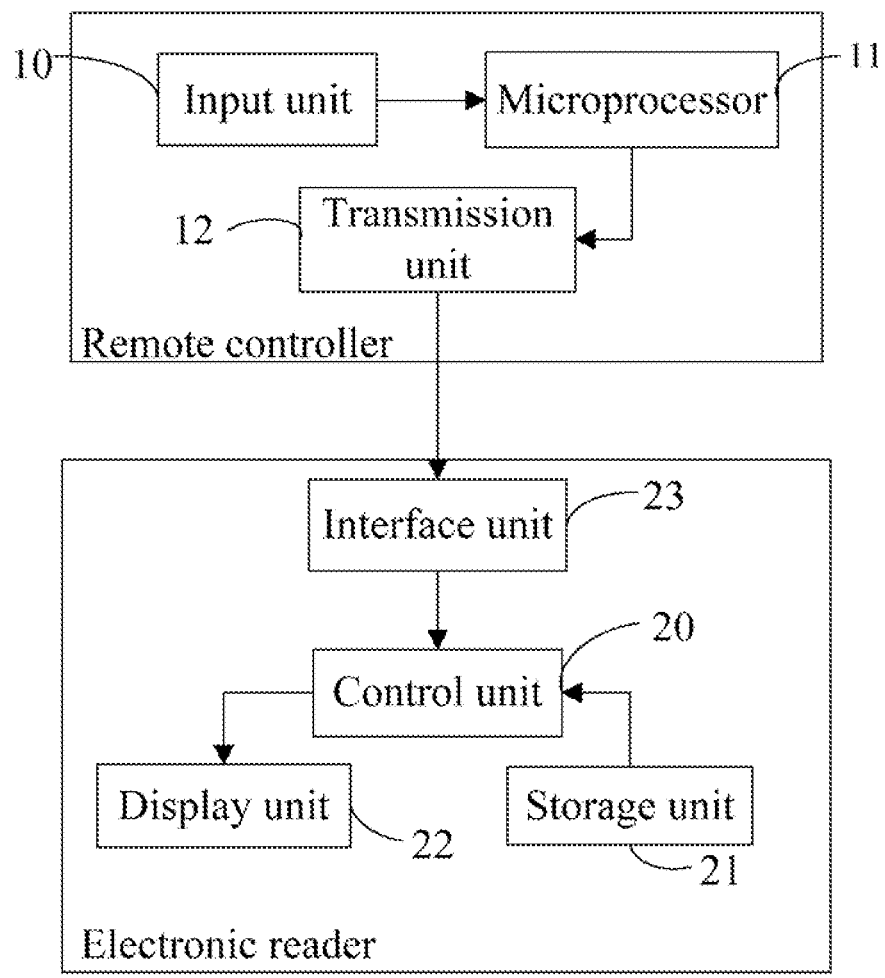
FIG. 2 is a block diagram of a hardware infrastructure of the remote control and the electronic reader of FIG. 1.

Referring to FIG. 2, in a first embodiment, the transmission unit 12 is electrically connected to the electronic reader 200 via a USB data line and transmits operation signals to the electronic reader 200 through the USB data line. The microprocessor 11 determines an operation type of the users according to the control signals generated by the button and generates operation signals corresponding to the operation type. In the embodiment, if the control signal exists beyond a first preset time period, but not beyond a second preset time period, such as 2 ms<t≤500 ms, the microprocessor 11 determines that the operation type is the first type; if a control signal exists beyond the second preset time period, but not beyond a third preset time period, such as 500 ms<t≤2000 ms, the microprocessor 11 determines that the operation type is the second type; if the control signal exists beyond the third preset time period, such as t>2000 ms, the microprocessor 11 determines that the operation type is the third type. The transmission unit 12 transmits corresponding operation signals corresponding to an operation type to the electronic reader 200.

In the embodiment, the electronic reader 200 includes a control unit 20, a storage unit 21, a display unit 22 and an interface unit 23. The interface unit 23 is for receiving the USB plug of the remote control 100 to receive the operation signals from the remote control 100. The storage unit 21 stores digital files. The reading files are displayed for users to choose and read. The control unit 20 determines an operation type according to the Pulse Width Modulation (PWM) waves of the operation signals. If the operation type is the first type, the control unit 20 flips a page forward and updates the content on the display unit 22 accordingly. If the operation type is the second type, the control unit 20 flips a page backwards and updates the content on the display unit 22 accordingly. If the operation type is the third type, the control unit 20 returns to the homepage of a currently read file and updates the content on the display unit 22 accordingly.

Figure 3:
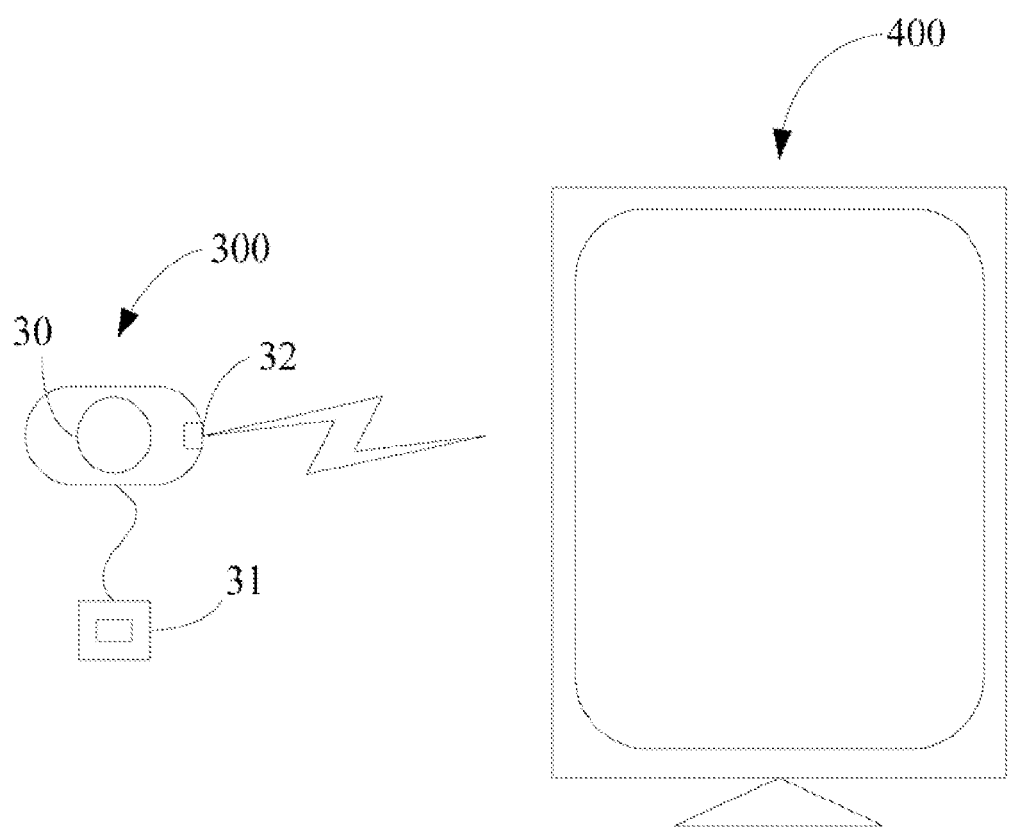
FIG. 3 is a schematic view of a remote control of an electronic reader in accordance with a second exemplary embodiment.
Figure 4:
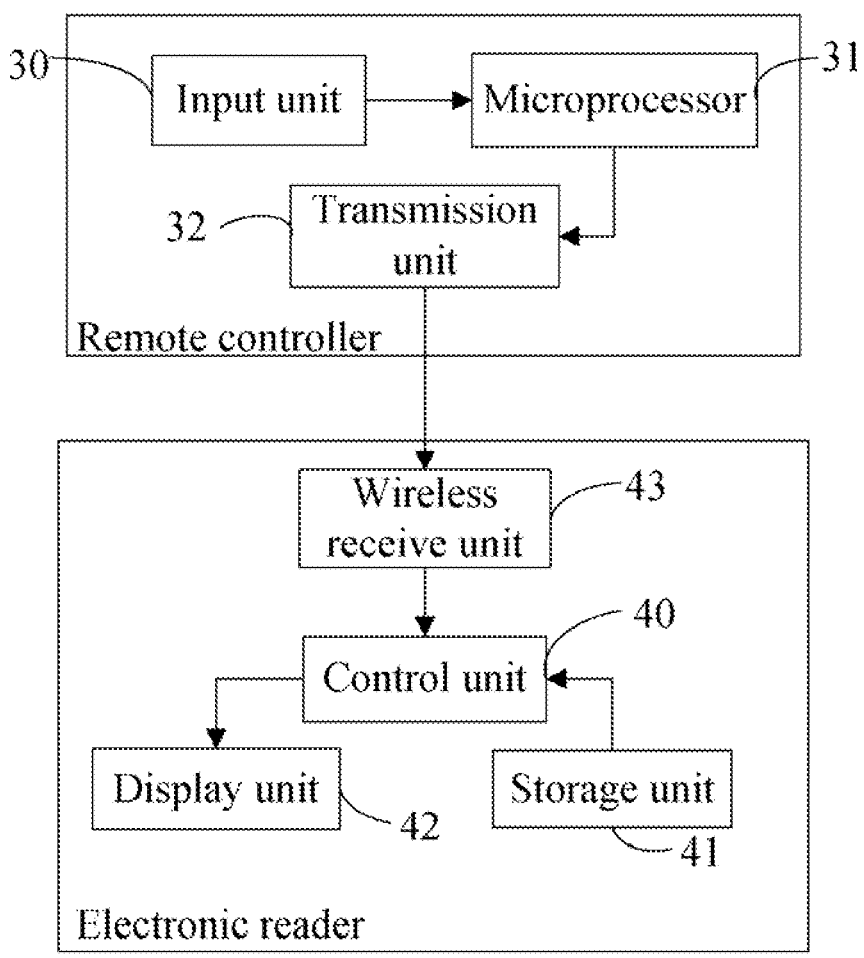
FIG. 4 is a block diagram of a hardware infrastructure of the remote control and the electronic reader of FIG. 3.

Referring to FIGS. 3 and 4, in a second embodiment, the remote control 300 includes an input unit 30, a microprocessor 31, and a transmission unit 32. The input unit 30 is a button. The transmission unit 32 is a wireless transmission unit, such as an infrared transmission or an ultrasonic transmission. The microprocessor 31 determines an operation type of the users according to the control signals generated by the button and generates operation signals corresponding to the operation type. In the embodiment, if the control signal exists beyond a first preset time period, but not beyond a second preset time period, such as 2 ms<t≤500 ms, the microprocessor 11 determines that the operation type is the first type; if control signals exist beyond the second preset time period, but not beyond a third preset time period, such as 500 ms<t≤2000 ms, the microprocessor 11 determines that the operation type is the second type; if the control signal exists beyond the third preset time period, such as t>2000 ms, the microprocessor 11 determines that the operation type is the third type. The transmission unit 32 transmits operation signal corresponding to an operation type to the electronic reader 400. In the embodiment, the electronic reader 400 includes a control unit 40, a display unit 42, a storage unit 41, and a wireless receiving unit 43. The wireless receiving unit 43 corresponds to the transmission unit 32 of the remote control 300 to receive the operation signal. The storage unit 41 stores digital files. The reading files are displayed for users to choose and read. The control unit 40 determines an operation type according to the Pulse Width Modulation (PWM) waves of the operation signals and controls the electronic reader 400 to flip pages according to an operation type.

Figure 5:
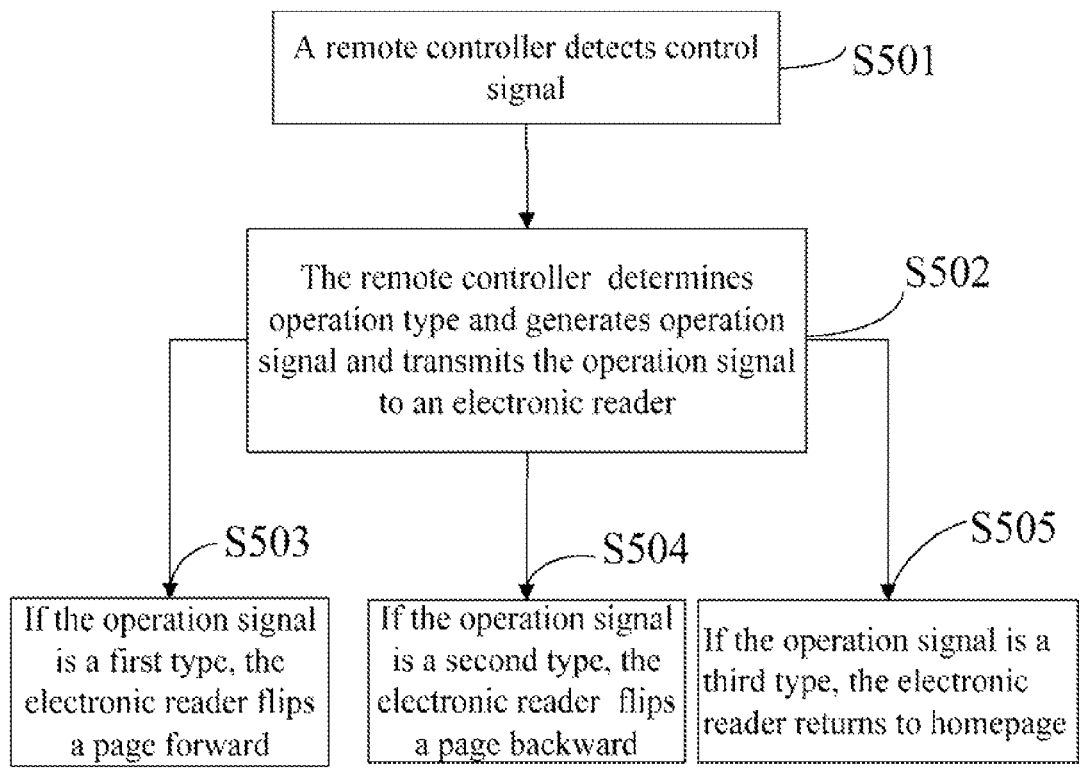
FIG. 5 is a flowchart of a remote control method applied in an electronic reader in accordance with an exemplary embodiment.

Referring to FIG. 5, shows a remote control method of a remote control 100 in accordance with an exemplary embodiment.

In step S501, the remote control 100 detects control signal generated by a button of input unit.

In step S502, a microprocessor 11 of the remote control 100 determines an operation type according to the control signals and generates an operation signal corresponding to the operation type and transmits the operation signal to an electronic reader 200. In the embodiment, the operation type is a first type, a second type, or a third type.

In step S503, the electronic reader 200 flips a page forward according to the operation signal if the operation type is the first type.

In step S504, the electronic reader 200 flips a page backward according to the operation signal if the operation type is the second type.

In step S505, the electronic reader 200 returns to homepage of a currently read file according to the operation signal if the operation type is the third type.

In the embodiment, if the control signal exists beyond a first preset time period, but not beyond a second preset time period, such as 2 ms<t≤500 ms, the microprocessor 11 determines that the operation type is the first type; if the control signal exists beyond the second preset time period, but not beyond a third preset time period, such as 500 ms<t≤2000 ms, the microprocessor 11 determines that the operation type is the second type; if the control signal exists beyond the third preset time period, such as t>2000 ms, the microprocessor 11 determines that the operation type is the third type.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A remote control comprising:
a button for generating control signals;
a transmission unit; and
a microprocessor unit configured toanalyze operation type according to the control signals and generates operation signals corresponding to an operation type, and transmit the operation signals to an electronic reader via the transmission unit to signal the electronic reader to flip page, wherein if the operation signal is a first type, the electronic reader flips a page forward, or if the operation signal is a second type, the electronic reader flips a page backward; or if the operation signal is a third type, the electronic reader returns to homepage of a currently read file: if the control signal exists beyond a first preset time period, but not beyond a second preset time period, the microprocessor determines the operation type is the first type; if control signal exists beyond the second preset time period, but not beyond a third preset time period, the microprocessor determines the operation type is the second type; if the control signal exists beyond the third preset time period, the microprocessor determines the operation type is the third type.

2. A remote control method applied to an electronic reader, comprising:
providing a remote controller;
the remote control detecting control signal generated by an input unit of the remote controller;
the remote control analyzing an operation type according to the control signal and generating operation signals corresponding to the operation type, the operation type being a first type, a second type or a third type;
the remote control transmitting the operation signal to the electronic reader to signal the electronic reader to flip a page forward if the operation type is the first type, or signal the electronic reader to flip a page backward if the operation type is the second type, or signal the electronic reader to return to the homepage of a current reading file if the operation type is the third type, and
if the control signal exists beyond a first preset time period, but not beyond a second preset time period, determining the operation type is the first type; if control signal exists beyond the second preset time period, but not beyond a third preset time period, determining the operation type is the second type; if the control signal exists beyond the third preset time period, determining the operation type is the third type.

3. A remote control comprising:
a button configured to generate control signals;
a transmission unit; and
a microprocessor unit configured to analyze an operation type according to the control signals and generates operation signals corresponding to the operation type, and transmit the operation signals to an electronic reader via the transmission unit to signal the electronic reader to flip page;
if the control signal exists beyond a first preset time period, but not beyond a second preset time period, the microprocessor determines the operation type is the first type; if control signal exists beyond the second preset time period, but not beyond a third preset time period, the microprocessor determines the operation type is the second type; if the control signal exists beyond the third preset time period, the microprocessor determines the operation type is the third type.

* * * * *